United States Patent
Korhonen

Patent Number: 6,091,024
Date of Patent: Jul. 18, 2000

[54] HOLDER FOR MOUNTING A PLATE WITHIN AN ENCLOSURE FOR ELECTRIC INSTALLATIONS

[75] Inventor: Olli Korhonen, Espoo, Finland

[73] Assignee: Fibox Oy Ab, Jorvas, Finland

[21] Appl. No.: 09/055,537

[22] Filed: Apr. 6, 1998

[30] Foreign Application Priority Data

Apr. 7, 1997 [FI] Finland ..................... 971444

[51] Int. Cl.[7] ..................................... H02G 3/14
[52] U.S. Cl. .............. 174/66; 220/3.8; 220/241
[58] Field of Search .................. 174/1, 50, 66, 174/67; 220/3.8, 241, 242

[56] References Cited

U.S. PATENT DOCUMENTS

| | | | |
|---|---|---|---|
| 2,880,264 | 3/1959 | Ruskin ....................... | 174/67 |
| 3,200,989 | 8/1965 | Hubbell ...................... | 220/242 |
| 3,252,611 | 5/1966 | Weitzman et al. .............. | 220/242 |
| 3,811,004 | 5/1974 | Moore ........................ | 174/67 |
| 4,058,358 | 11/1977 | Carlisle ..................... | 220/242 X |
| 5,162,978 | 11/1992 | Vogt et al. . | |
| 5,235,494 | 8/1993 | Chang et al. . | |
| 5,731,544 | 3/1998 | Burck et al. ................. | 174/66 |
| 5,773,760 | 6/1998 | Stark et al. ................. | 174/66 |
| 5,929,379 | 7/1999 | Reiner et al. ................ | 174/66 |
| 5,955,702 | 9/1999 | Grossman et al. .............. | 174/66 |

FOREIGN PATENT DOCUMENTS 4-236496  8/1992  Japan .

*Primary Examiner*—Dean A. Reichard
*Attorney, Agent, or Firm*—Altera Law Group LLC

[57] ABSTRACT

The invention relates to a holder for mounting a plate, such as a circuit card, within an enclosure for electric installations, which enclosure includes a bottom part and which holder is constituted by an elongated element including a body part and having a fastening mechanism at least one end for fastening the holder to the bottom part, wherein the holder includes a hinge mechansim for fastening the plate at its one edge pivotally to the holder so that the plate can be lifted upwards at its edge opposite to said one edge, which enables an access into the space below the plate in the enclosure, when the holder is fastened to the bottom part of the enclosure. To enable an easy and rapid access to a space below the plate in the enclosure without needing to remove the holder and the plate from the enclosure and to enable the plate mounted in place to open from both directions, alternatively, and to be detached from the enclosure, the holder includes a holder member and a separate connecting member includes a fastening mechansim for fastening the plate to the connecting member, which holder member and connecting member together form a hinge of shaft-slot type having a hinge shaft and a slot, the slot being defined by a flexible wall arranged to flex when a force is directed on the horizontal connecting member supported on the holder member and on the hinge shaft, said force being substantially perpendicular with respect to the connecting member and directed upwards from the end surface of the connecting member opposite to the end surface, for detaching the connecting member from the holder member.

15 Claims, 2 Drawing Sheets

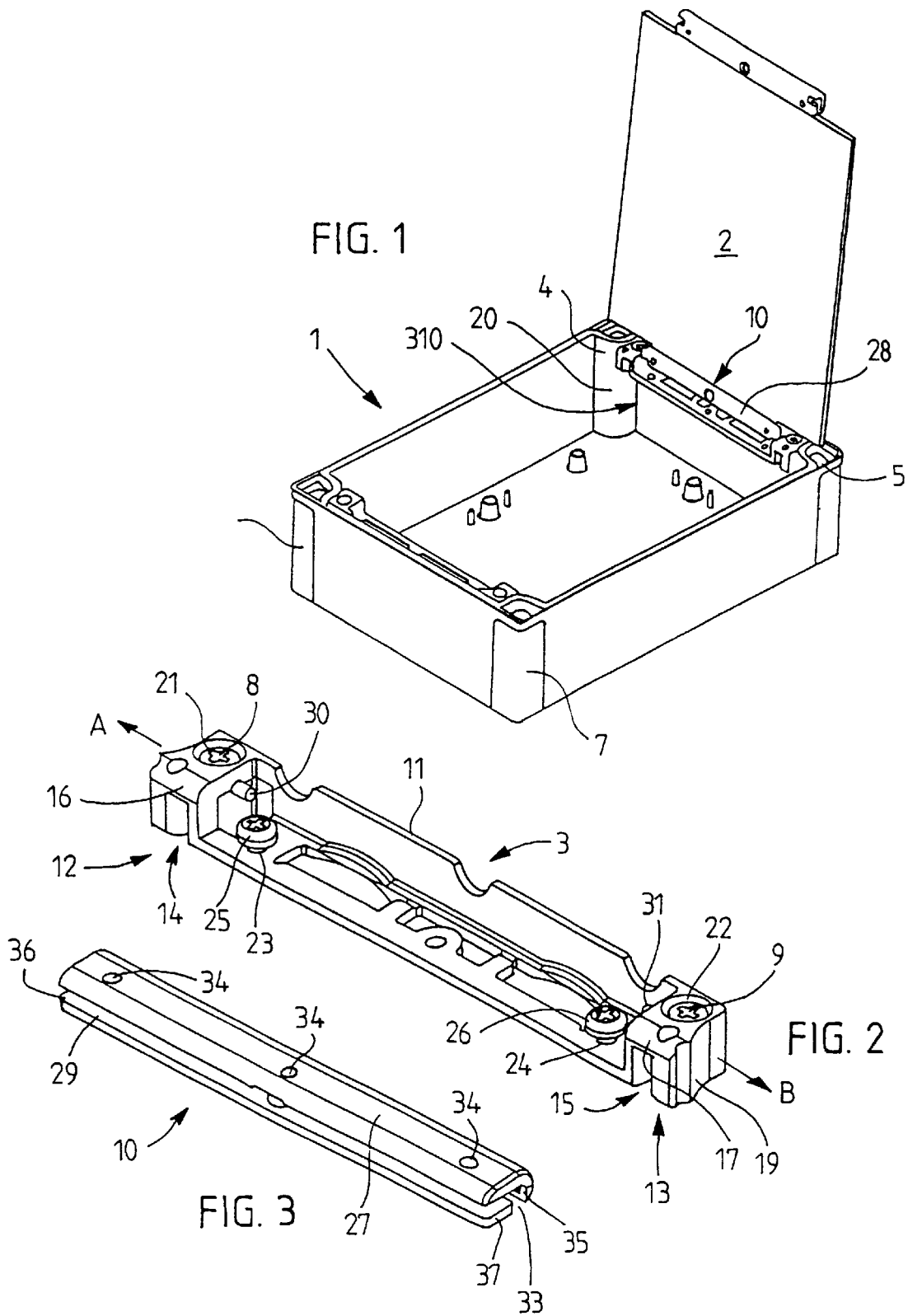

HOLDER FOR MOUNTING A PLATE WITHIN AN ENCLOSURE FOR ELECTRIC INSTALLATIONS

BACKGROUND OF THE INVENTION

The invention relates to a holder for mounting a plate, such as a front plate, a contact protective plate or a circuit card, within an enclosure for electric installations, which enclosure comprises a bottom part and which holder is constituted by an elongated element comprising a body part and having fastening means at least at one end for fastening the holder to the bottom part, wherein the holder comprises hinge means for fastening the plate at its one edge pivotally to the holder so that the plate can be lifted upwards at its edge opposite to said one edge, which enables an access into the space below the plate in the enclosure, when the holder is fastened to the bottom part of the enclosure.

Many kinds of holders are known for mounting plates in enclosures for electric installations. After the plates have been mounted to the holders in the enclosure, the space below the plates in the enclosure is not accessible without loosening plates from holders or holders from the enclosure. A need to get into the interior of the enclosure arises fairly often when the enclosure is already finished containing electric components of different kinds. This need may for instance arise because there is some fault to be repaired in the components of the enclosure or because alterations have to be made in the component content.

U.S. Pat. No. 5,235,494 discloses a holder enabling access into the space below a mounting plate in the enclosure, when the plate is fastened to the bottom part of the enclosure. This known holder does not, however, enable access to said space by lifting from either edge of the plate. Further, it does not enable easy removal of the plate from the enclosure only by lifting.

BRIEF DESCRIPTION OF THE INVENTION

The object of the present invention is to facilitate and accelerate the accomplishment of maintenance and alterations. This object is achieved by the present invention, i.e. a holder for mounting a plate, such as a front plate, a contact protective plate or a circuit card, within an enclosure for electric installations, which enclosure comprises a bottom part and which holder is constituted by an elongated element comprising a body part and having fastening means at least at one end for fastening the holder to the bottom part, wherein the holder comprises hinge means for fastening the plate at its one edge pivotally to the holder so that the plate can be lifted upwards at its edge opposite to said one edge, which enables an access into the space below the plate in the enclosure, when the holder is fastened to the bottom part of the enclosure wherein the holder comprises a holder member and a separate connecting member comprising fastening means for fastening the plate to the connecting member, which holder member and connecting member together form hinge means of shaft-slot type, the hinge means comprising a hinge shaft and a slot, the slot being defined by a flexible wall arranged to flex when a force is directed on the horizontal connecting member supported on the holder member and on the hinge shaft, said force being substantially perpendicular with respect to the connecting member and directed upwards from the end surface of the connecting member opposite to the end surface, for detaching the connecting member from the holder member.

The preferred embodiments of the holder according to the invention are presented in the attached claims 2 to 9.

The holder of the invention enables an easy and rapid hinged fastening of a plate to an enclosure, which provides an easy access into the space below the plate in the enclosure: the plate is at first fastened to the connecting member wherever it is easiest, i.e. not necessarily at the site of the enclosure, after which the plate and its connecting member can be fastened without tools to the holder member, which is fastened to the enclosure. Because the opposite edges of the plate comprise identical hinge means, the hinging direction of the plate can be chosen without needing various hinging components depending on the opening direction. Thanks to the hinging means, the plate mounted in place can be opened from both directions, alternatively, or can be detached from the enclosure. An opening of the plate, i.e. an access to the components of the enclosure below the plate, does not necessarily require tools.

BRIEF DESCRIPTION OF THE FIGURES

In the following, the invention is described in greater detail by means of one preferred embodiment with reference to the attached drawing, where FIG. 1 shows a holder of the invention mounted within an enclosure;

FIGS. 2 and 3 show components of the holder of FIG. 1 separately;

DETAILED DESCRIPTION OF THE INVENTION

Figure 4:
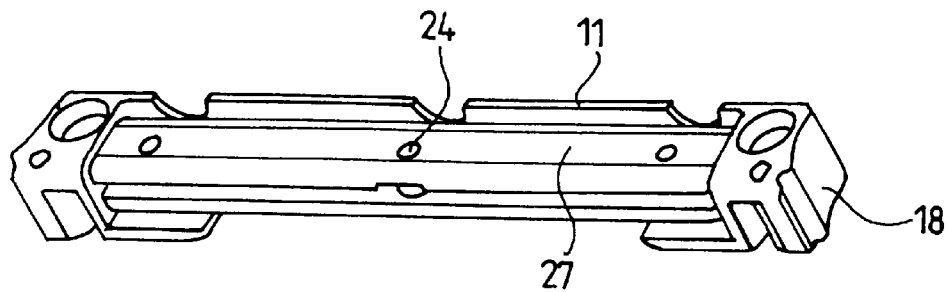
FIGS. 4 and 5 illustrate the operation of the holder of FIG. 1.

FIG. 1 shows a bottom part 1 of an enclosure for electric installations, a front plate 2 being fastened to the bottom part by means of a holder 310 according to the invention. A cover of the enclosure is not shown in the figure. The enclosure is of a type which comprises corner turrets 4 to 7, one in each corner of the enclosure.

The holder 310, comprising a holder member 3 and a connecting member 10, is arranged to be supported on the upper part of the corner turrets 4 and 5, to which it is fastened by means of screws 8, 9 (see FIG. 2), for which there are holes 21, 22 in the holder member.

In FIGS. 2 and 3, the holder member 3 and its connecting member 10 are shown in more detail. The holder member 3 comprises an elongated body part 11, having wedge members 12 and 13 at its both ends. There is a slit 14 and 15, respectively, between the wedge members 12, 13 and the ends of the body part 11. The slits 14, 15 provide the holder member 3 with material weakenings 16 and 17, which enable a flexing or yielding of the wedge members 12, 13 making those move away from the body part 11, whereby the holder member 3 becomes longer when the screws 8 and 9 are screwed inwards, i.e. tightened. Arrows A and B indicate directions in which the wedge members 12, 13 yield when the screws 8, 9 are tightened. When the wedge members 12, 13 yield in the directions of the arrows A and B, the slits 14, 15 become bigger.

From FIGS. 2 and 4 appears that the wedge members 12, 13 comprise support surfaces 18, 19 having a design corresponding to the design of the corner turrets 4, 5. Accordingly, the support surfaces 18, 19 are curved, like the surfaces 20 of the corner turrets 4, 5 bearing against the wedge members 12, 13.

Figure 5:
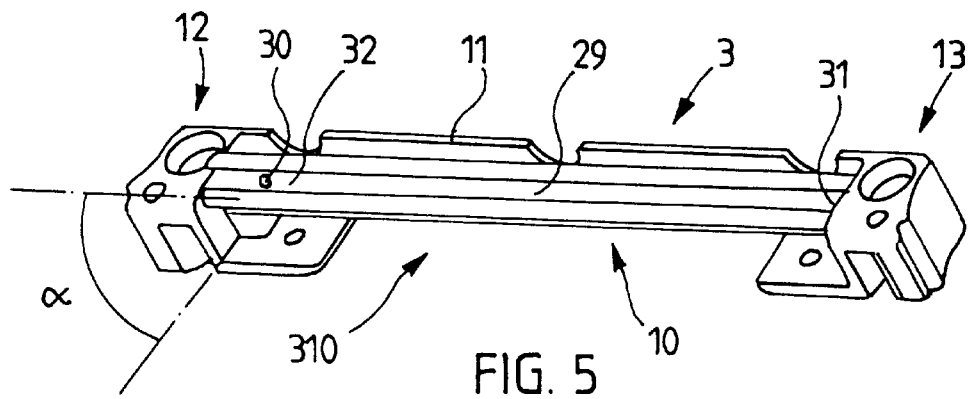

The plate 2 is fastened to the holder member through the elongated connecting member 10 comprising two end surfaces 27, 28, see FIGS. 1 and 3. The plate 2 is then fastened to a groove 29 of the connecting member 10. The thickness of the groove corresponds approximately to the thickness of the plate 2 and the length corresponds to the length of the body part 11 of the holder member. The connecting member 10 is able to turn the plate 2 so that it becomes inclined with respect to the bottom of the enclosure, when the holder 310 has been mounted in place. In FIG. 1, the plate 2 is turned to a position in which it forms a right angle with the bottom of the enclosure. In FIG. 4, the connecting member is in a position giving the plate a direction identical with the direction of the bottom of the enclosure. In FIG. 5, the connecting member is turned to an angle α=about 45 degrees. The angle may vary steplessly within the range 0 to 90 degrees.

In order that the connecting member 10 may turn in the above way, the holder 310 comprises hinge means. The hinge means comprise two short shafts or hinge pins 30, 31 arranged in the holder member 3 and slots 32, 33 in the connecting member 10. The slots 32, 33 cooperating with the hinge pins 30, 31 are arranged to open downwards from the lower end surface 28 of the connecting member. Locking walls 35 prevent the connecting member 10 from being removed from the hinge pins 30, 31, if the plate 2 is not parallel to the bottom of the enclosure. Other types of locking means than locking walls may be designed.

The slots 32, 33 are surrounded by flexible walls 36, 37. The significance of the flexible walls 36, 37 is that the connecting member 10, being in horizontal position with respect to the holder member 3, can be snapped in place by pressing it against the holder member so that the slots 32, 33 surround the hinge pins 30, 31. The slots 32, 33 come loose from the hinge pins 30, 31 and the connecting member 10 with the plate 2 can be detached from the holder member 3, when the connecting member 10 being in the horizontal position is lifted with a sufficient force so that the walls 36, 37 pass the hinge pins by yielding.

The connecting member 10 comprises 1 to 3 holes 34 for fastening the plate 2 thereto by screws 25, 26.

When the holder 3 is fastened to the bottom part of the enclosure, it is at first mounted at a desired height of the corner turrets 4, 5, after which the screws 8, 9 (see FIG. 2) are tightened, whereby the wedge members 12, 13 spread in the lateral direction and press the support surfaces 18, 19 against the curved surfaces 20 of the turret members. In this way, the holder can be fastened by means of friction surfaces constituted by the support surfaces 18, 19 to the corner turrets 4, 5. The fastening is very firm.

Figure 6:
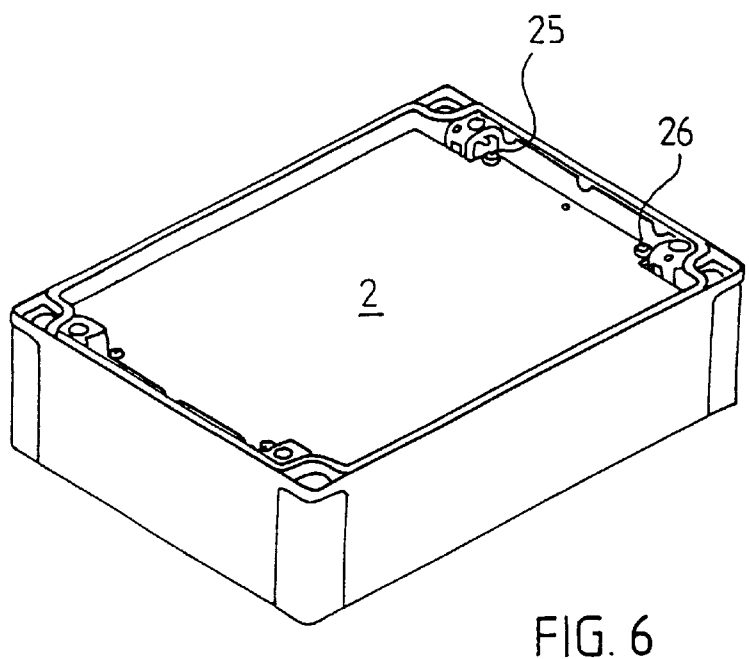
FIG. 6 shows how the holder is used for mounting a plate to an enclosure without the use of hinges.

From FIG. 2 is seen that the holder comprises, besides said holes 21, 22, also two other fastening holes 23, 24 at the ends of the body part 11. These fastening holes 23, 24 are intended for fastening the plate 2 fixedly by the screws 25, 26 directly to the holder member 3 without using the connecting member 10 of FIG. 3. The screws 25, 26 enable a fastening of the plate 2 fixedly, i.e. without hinges, to the holder member, see FIG. 6.

The holder member 3 is preferably made of plastic integrally with the wedge members 12, 13. The length of the holder member is chosen to be compatible with the inner dimensions of the enclosure, naturally. The connecting member 10 is also made of plastic in one piece.

The invention has been described above by means of only one embodiment, and it is pointed out therefore that the invention may be implemented in many ways within the scope of the attached claims. It is thus, for instance, conceivable that the hinge pin is arranged in the connecting member and the hinge slot in the holder member. Instead of two hinge pins, one long hinge pin or shaft extending from one end of the body part of the holder member to the other can be used. Correspondingly, instead of two slots, one slot extending from one end of the connecting member to the other can be used. It is also conceivable that only one end of the holder is provided with a wedge member, because a lengthening of the holder is possible also by a solution of this kind and the holder can be locked to the bottom part of the enclosure by friction joint. An advantage of such a solution is that the holder can be fastened to the enclosure extremely rapidly by using one screw only. It is further possible that the holder is arranged to be fastened to the inner wall of the enclosure such that it is fastened to the inner walls and not to a corner turret. A displacement of the wedge members in such a way that the holder member becomes longer can be implemented in other ways than by providing a slit between the body part of the holder member and the wedge member: it is for instance conceivable that the material of the wedge members yields so that when a screw is screwed into a hole of a wedge member, the hole spreads and causes a corresponding expansion or enlargement of the wedge member. In the last-mentioned case, the support surface will naturally be small. It is not absolutely necessary that the fastening means is a screw, even if this is preferable, because it is a standard component.

What is claimed is:

1. Holder for mounting a plate within an enclosure for electric installations, which enclosure comprises a bottom part and which holder is constituted by an elongated element comprising a body part and having fastening means at least at one end for fastening the holder to the bottom part, wherein the holder comprises hinge means for fastening the plate at its one edge pivotally to the holder so that the plate can be lifted upwards at its edge opposite to said one edge, which enables an access into the space below the plate in the enclosure, when the holder is fastened to the bottom part of the enclosure, wherein the holder comprises a holder member and a connecting member separate from the holder member and including a first end surface and a second end surface opposite to the first end surface, and fastening means for fastening the plate to the connecting member, which holder member and connecting member together form hinge means of shaft-slot type, the hinge means comprising a hinge shaft and a slot, the slot being defined by a flexible wall arranged to flex perpendicular to the hinge shaft so that the slot defined by the flexible wall passes the hinge shaft by yielding when a force is directed on the connecting member supported on the holder member and on the hinge shaft, said force being substantially perpendicular with respect to the connecting member and directed upwards from the first end surface of the connecting member opposite to the second end surface, for detaching the connecting member from the holder member, wherein the slot is formed on the connecting member and arranged to open downwards from one end surface of the connecting member, whereby the hinge shaft is formed on the holder member.

2. Holder according to claim 1, wherein the connecting member comprises a groove for receiving an edge of the plate.

3. Holder according to claim 1, wherein the connecting member comprises 1 to 3 holes for receiving one or more tightening means for fastening the plate to the connecting member.

4. Holder according to claim 1, wherein the connecting member and the slot are integral with one another and are made of plastic.

5. Holder according to claim 1, wherein the body part of the holder comprises at least one fastening hole for fastening the plate fixedly to the holder member.

6. Holder according to claim 1, wherein the slot is formed on the connecting member and arranged to open downwards from one end surface of the connecting member, whereby the hinge shaft is formed on the holder member.

7. Holder according to claim 6, wherein locking means prevent the connecting member, bent into an angle α, from being removed from the hinge shafts by lifting the connecting member.

8. Holder according to claim 7, wherein the connecting member is constituted by an elongated element and that the hinge shaft comprises a first hinge pin and a second hinge pin, and wherein the slot comprises a first slot and a second slot so that the first hinge pin is arranged at the first end of the body part and the second hinge pin is arranged at the second end of the body part and the first slot is provided at the first end of the connecting member and the second slot is provided at the second end of the connecting member.

9. Holder according to claim 8, wherein the holder member and hinge shaft are integral with one another and are made of plastic.

10. Holder for mounting a plate within an enclosure for electric installations, which enclosure comprises a bottom part and which holder is constituted by an elongated element comprising a body part and having fastening means at least at one end for fastening the holder to the bottom part, wherein the holder comprises hinge means for fastening the plate at its one edge pivotally to the holder so that the plate can be lifted upwards at its edge opposite to said one edge, which enables an access into the space below the plate in the enclosure, when the holder is fastened to the bottom part of the enclosure, wherein the holder comprises a holder member and a connecting member separate from the holder member and including a first end surface and a second end surface opposite to the first end surface, and fastening means for fastening the plate to the connecting member, which holder member and connecting member together form hinge means of shaft-slot type, the hinge means comprising a hinge shaft and a slot, the slot being defined by a flexible wall arranged to flex when a force is directed on the connecting member supported on the holder member and on the hinge shaft, said force being substantially perpendicular with respect to the connecting member and directed upwards from the first end surface of the connecting member opposite to the second end surface, for detaching the connecting member from the holder member, wherein the slot is formed on the connecting member and arranged to open downwards from one end surface of the connecting member, whereby the hinge shaft is formed on the holder member.

11. Holder according to claim 10, wherein locking means prevent the connecting member, bent into an angle α, from being removed from the hinge shafts by lifting the connecting member.

12. Holder according to claim 11, wherein the connecting member is constituted by an elongated element and that the hinge shaft comprises a first hinge pin and a second hinge pin, and wherein the slot comprises a first slot and a second slot so that the first hinge pin is arranged at the first end of the body part and the second hinge pin is arranged at the second end of the body part and the first slot is provided at the first end of the connecting member and the second slot is provided at the second end of the connecting member.

13. Holder according to claim 12, wherein the holder member and hinge shaft are integral with one another and are made of plastic.

14. Holder for mounting a plate within an enclosure for electric installations, which enclosure comprises a bottom part and which holder is constituted by an elongated element comprising a body part and having fastening means at least at one end for fastening the holder to the bottom part, wherein the holder comprises hinge means for fastening the plate at a first edge pivotally to the holder so that the plate can be lifted upwards at a second edge opposite to the first edge, which enables an access into the space below the plate in the enclosure, when the holder is fastened to the bottom part of the enclosure, wherein the holder comprises a holder member and a connecting member separate from the holder member and including a first end surface and a second end surface opposite to the first end surface, and fastening means for fastening the plate to the connecting member, which holder member and connecting member together form hinge means of shaft-slot type, the hinge means comprising a hinge shaft and a slot, the slot being defined by a flexible wall arranged to flex when a force is directed on the connecting member supported on the holder member and on the hinge shaft, said force being substantially perpendicular with respect to the connecting member and directed upwards from the first end surface of the connecting member opposite to the second end surface, for detaching the connecting member from the holder member, wherein the connecting member comprises a groove for receiving the first edge of the plate.

15. Holder for mounting a plate within an enclosure for electric installations, which enclosure comprises a bottom part and which holder is constituted by an elongated element comprising a body part and having fastening means at least at one end for fastening the holder to the bottom part, wherein the holder comprises hinge means for fastening the plate at its one edge pivotally to the holder so that the plate can be lifted upwards at its edge opposite to said one edge, which enables an access into the space below the plate in the enclosure, when the holder is fastened to the bottom part of the enclosure, wherein the holder comprises a holder member and a connecting member separate from the holder member and including a first end surface and a second end surface opposite to the first end surface and fastening means for fastening the plate to the connecting member, which holder member and connecting member together form hinge means of shaft-slot type, the hinge means comprising a hinge shaft and a slot, the slot being defined by a flexible wall arranged to flex when a force is directed on the connecting member supported on the holder member and on the hinge shaft, said force being substantially perpendicular with respect to the connecting member and directed upwards from the first end surface of the connecting member opposite to the second end surface, for detaching the connecting member from the holder member, wherein the connecting member comprises 1 to 3 holes for receiving one or more tightening means for fastening the plate to the connecting member.

* * * * *